United States Patent
Carney et al.

(10) Patent No.: US 9,631,054 B2
(45) Date of Patent: Apr. 25, 2017

(54) MATTE FINISH POLYIMIDE FILMS AND METHODS RELATING THERETO

(71) Applicant: E I DU PONT DE NEMOURS AND COMPANY, Wilmington, DE (US)

(72) Inventors: Thomas Edward Carney, Orient, OH (US); Jeffrey Michael Bartolin, Westerville, OH (US); Meredith L. Dunbar, Canal Winchester, OH (US); Scott John Herrmann, Gahanna, OH (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 1241 days.

(21) Appl. No.: 13/625,167

(22) Filed: Sep. 24, 2012

(65) Prior Publication Data

US 2013/0029148 A1    Jan. 31, 2013

Related U.S. Application Data

(63) Continuation-in-part of application No. 12/842,174, filed on Jul. 23, 2010, now Pat. No. 8,574,720.

(51) Int. Cl.
| | |
|---|---|
| *C08G 73/10* | (2006.01) |
| *C08J 5/18* | (2006.01) |
| *C08K 3/04* | (2006.01) |
| *C09J 7/02* | (2006.01) |
| *C09J 163/00* | (2006.01) |
| *B32B 5/16* | (2006.01) |
| *B32B 27/28* | (2006.01) |

(52) U.S. Cl.
CPC ....... *C08G 73/105* (2013.01); *C08G 73/1075* (2013.01); *C08J 5/18* (2013.01); *C09J 7/0282* (2013.01); *C09J 163/00* (2013.01); *B32B 5/16* (2013.01); *B32B 27/281* (2013.01); *C08G 73/1071* (2013.01); *C08J 2379/08* (2013.01); *C08K 3/04* (2013.01); *C09J 2205/106* (2013.01); *C09J 2463/00* (2013.01); *C09J 2479/086* (2013.01); *Y10T 428/28* (2015.01); *Y10T 428/287* (2015.01); *Y10T 428/2982* (2015.01)

(58) Field of Classification Search
CPC ..... C08G 73/1071; C08J 2379/08; C08J 5/18; C08K 3/04; C09J 163/00; C09J 2205/106; C09J 2463/00; C09J 2479/086; C09J 7/0282; B32B 27/281; B32B 5/16; Y10T 428/287; Y10T 428/2982
See application file for complete search history.

(56) References Cited

U.S. PATENT DOCUMENTS

| | | | |
|---|---|---|---|
| 4,677,528 A | 6/1987 | Miniet | |
| 4,778,872 A | 10/1988 | Sasaki et al. | |
| 4,822,718 A | 4/1989 | Latham et al. | |
| 5,031,017 A | 7/1991 | Pernyeszi et al. | |
| 5,166,308 A | 11/1992 | Kreuz et al. | |
| 5,302,652 A | 4/1994 | Parish | |
| 5,358,782 A | 10/1994 | Parish | |
| 5,609,914 A * | 3/1997 | Ma | B41M 3/00 347/106 |
| 5,780,201 A | 7/1998 | Sabnis et al. | |
| 6,794,031 B2 | 9/2004 | Murakami et al. | |
| 6,908,685 B2 | 6/2005 | Uhara et al. | |
| 7,550,194 B2 | 6/2009 | Simone et al. | |
| 2004/0142191 A1 | 7/2004 | Mei-Yen et al. | |
| 2004/0142831 A1 | 7/2004 | Jager Lezer | |
| 2004/0249019 A1 | 12/2004 | Meyer et al. | |
| 2005/0074592 A1* | 4/2005 | Hashimoto | B32B 15/08 428/220 |
| 2005/0080228 A1 | 4/2005 | Silvi et al. | |
| 2005/0096429 A1 | 5/2005 | Lee et al. | |
| 2005/0164022 A1 | 7/2005 | Kliesch et al. | |
| 2007/0025740 A1 | 2/2007 | Katoh et al. | |
| 2007/0158869 A1 | 7/2007 | Yanagida et al. | |
| 2009/0022939 A1 | 1/2009 | Yanagida et al. | |
| 2009/0062505 A1 | 3/2009 | Miyamoto | |
| 2010/0129605 A1* | 5/2010 | Yasuda | C08J 5/18 428/147 |
| 2013/0158195 A1* | 6/2013 | Chen | C08J 5/18 524/600 |

FOREIGN PATENT DOCUMENTS

| | | |
|---|---|---|
| CA | 708896 | 5/1965 |
| EP | 441321 A2 | 8/1991 |
| EP | 659553 A1 | 6/1995 |
| EP | 879839 A1 | 11/1998 |
| EP | 1484361 A1 | 12/2004 |
| EP | 1732362 A1 | 12/2006 |
| EP | 2072580 A1 | 6/2009 |
| EP | 2218754 A1 | 8/2010 |
| GB | 2176193 A1 | 12/1986 |

(Continued)

OTHER PUBLICATIONS

Machine translation of JP 06145378 A (1994).*
Machine translation of JP 08020721 A (1996).*
Machine translation of JP 2002256085 A (2002).*
Machine translation of JP 06100714 A (1994).*
Carney et al, U.S. Appl. No. 61/158,074, filed Mar. 6, 2009.
Carney et al, U.S. Appl. No. 12/842,174, filed Jul. 23, 2010.
Carney et al, U.S. Appl. No. 12/850,739, filed Aug. 5, 2010.
Carney et al, U.S. Appl. No. 13/486,284, filed Jun. 1, 2012.
Carney et al, U.S. Appl. No. 13/625,192, filed Sep. 21, 2012.
Carney et al, PCT/US11/24745 filed Feb. 14, 2011.
Search Report, PCT/US2010/044202 Filed Dec. 30, 2010.

(Continued)

*Primary Examiner* — Callie Shosho
*Assistant Examiner* — John Freeman

(57) ABSTRACT

The present disclosure is directed to a base film having a chemically converted polyimide, a particulate polyimide matting agent and a low conductivity carbon black. The particulate polyimide matting agent is present in an amount from 1.6 to 20 weight percent of the base film.

9 Claims, No Drawings

(56) References Cited

FOREIGN PATENT DOCUMENTS

| | | | |
|---|---|---|---|
| JP | 06100714 A | * | 4/1994 |
| JP | 06145378 A | * | 5/1994 |
| JP | 07126585 A1 | | 5/1995 |
| JP | 08020721 A | * | 1/1996 |
| JP | 2002256085 A | * | 9/2002 |
| WO | 2005/061200 A1 | | 7/2005 |
| WO | 2007/078857 A2 | | 7/2007 |
| WO | 2008/060302 A1 | | 5/2008 |
| WO | PCT/US10/25756 | | 3/2010 |

OTHER PUBLICATIONS

Search Report, PCT/US2011/024745 Filed Jul. 15, 2011.
Foster, J.K., Special Blacks Division Cabot Corporation, "Effects of Carbon Black Properties on Conductive Coatings", International Exhibition of Paint Industry Suppliers (1991).

* cited by examiner

MATTE FINISH POLYIMIDE FILMS AND METHODS RELATING THERETO

This application is a continuation-in-part of prior application Ser. No. 12/842,174, filed Jul. 23, 2010, now U.S. Pat. No. 8,574,720.

FIELD OF DISCLOSURE

The present disclosure relates generally to matte finish base films that are useful in coverlay applications and have advantageous dielectric and optical properties. More specifically, the matte finish base films of the present disclosure comprise a relatively low concentration of pigment and particulate polyimide matting agent in a polyimide film imidized by a chemical (as opposed to a thermal) conversion process.

BACKGROUND OF THE DISCLOSURE

Broadly speaking, coverlays are known as barrier films for protecting electronic materials, e.g., for protecting flexible printed circuit boards, electronic components, leadframes of integrated circuit packages and the like. A need exists however, for coverlays to be increasingly thin and low in cost, while not only having acceptable electrical properties (e.g., dielectric strength), but also having acceptable structural and optical properties to provide security against unwanted visual inspection and tampering of the electronic components protected by the coverlay.

SUMMARY

The present disclosure is directed to a base film. The base film comprises a chemically converted polyimide present in an amount from 61 to 96 weight percent of the base film. The chemically converted polyimide is derived from: i. at least 50 mole percent of an aromatic dianhydride, based upon a total dianhydride content of the chemically converted polyimide, and ii. at least 50 mole percent of an aromatic diamine based upon a total diamine content of the chemically converted polyimide. The base film further comprises: a low conductivity carbon black present in an amount from 2 to 9 weight percent of the base film; and a particulate polyimide matting agent present in an amount from 1.6 to 20 weight percent of the base film and having a density from 1.3 to 1.5 g/cc.

DETAILED DESCRIPTION

Definitions

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only to those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

"Dianhydride" as used herein is intended to include precursors or derivatives thereof, which may not technically be a dianhydride but would nevertheless react with a diamine to form a polyamic acid which could in turn be converted into a polyimide.

"Diamine" as used herein is intended to include precursors or derivatives thereof, which may not technically be a diamine but would nevertheless react with a dianhydride to form a polyamic acid which could in turn be converted into a polyimide.

"Polyamic acid" as used herein is intended to include any polyimide precursor material derived from a combination of dianhydride and diamine monomers or functional equivalents thereof and capable of conversion to a polyimide via a chemical conversion process.

"Chemical conversion" or "chemically converted" as used herein denotes the use of a catalyst (accelerator) or dehydrating agent (or both) to convert the polyamic acid to polyimide and is intended to include a partially chemically converted polyimide which is then dried at elevated temperatures to a solids level greater than 98%.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers, unless the context indicates or implies otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

Base Film

The base film of the present disclosure comprises a filled polyimide matrix, where the polyimide is created by a chemical conversion process. One advantage of a chemically converted polyimide (over a thermally converted polyimide) is that the amount of matting agent necessary to achieve sufficient low gloss is at least 10, 20, 30, 40 or 50 percent less than if a thermal conversion process is used. Generally accepted ranges for 60 degree gloss values are:

| | |
|---|---|
| <10 | flat |
| 10-70 | matte, satin, semi-gloss (various terms are used) |
| >70 | glossy. |

In some embodiments, the base film has a 60 degree gloss value between and optionally including any two of the following: 2, 3, 4, 5, 10, 15, 20, 25, 30 and 35. In some embodiments, the base film has a 60 degree gloss value from 2 to 35. In some embodiments, the base film has a 60 degree gloss value from 10 to 35. The 60 degree gloss value is measured using Micro-TRI-Gloss gloss meter. The lower loading of matting agent (made possible by the chemical conversion) is advantageous, because it: i. lowers overall cost; ii. simplifies the dispersion of matting agent into the polyamic acid (or other polyimide precursor material); and iii. provides the resulting base film with better mechanical properties (e.g., less brittleness). Another unexpected advantage of using a chemically converted polyimide is that the film is matte on both sides, even if cast onto a smooth surface. If both sides of the base film are matte, any additional layers may be applied to either side of the base film. In contradistinction, when similarly filled polyimide precursor films are solely thermally converted and cast on a smooth surface, the cast side tends to be glossy and the air side tends to be matte. In some embodiments, the base film has a 60 degree gloss value from 2 to 35 on both sides.

Yet another advantage is base films comprising a chemically converted polyimide have higher dielectric strength compared to base film comprising a solely thermally converted polyimide. Typically, the dielectric strength decreases as the amount of matting agent increases. So while low 60 degree gloss value can be achieved (air side only) in the solely thermal process, by increasing the amount of matting agent, the dielectric strength will decrease. In some embodiments, the base film dielectric strength is greater than 1400 V/mil (55 V/micron).

In a chemical conversion process, the polyamic acid solution is either immersed in or mixed with conversion (imidization) chemicals. In one embodiment, the conversion chemicals are tertiary amine catalysts (accelerators) and anhydride dehydrating materials. In one embodiment, the anhydride dehydrating material is acetic anhydride, which is often used in molar excess relative to the amount of amic acid (amide acid) groups in the polyamic acid, typically about 1.2 to 2.4 moles per equivalent of polyamic acid. In one embodiment, a comparable amount of tertiary amine catalyst is used.

Alternatives to acetic anhydride as the anhydride dehydrating material include: i. other aliphatic anhydrides, such as, propionic, butyric, valeric, and mixtures thereof; ii. anhydrides of aromatic monocarboxylic acids; iii. Mixtures of aliphatic and aromatic anhydrides; iv. carbodimides; and v. aliphatic ketenes (ketenes may be regarded as anhydrides of carboxylic acids derived from drastic dehydration of the acids).

In one embodiment, the tertiary amine catalysts are pyridine and beta-picoline and are typically used in amounts similar to the moles of anhydride dehydrating material. Lower or higher amounts may be used depending on the desired conversion rate and the catalyst used. Tertiary amines having approximately the same activity as the pyridine, and beta-picoline may also be used. These include alpha picoline; 3,4-lutidine; 3,5-lutidine; 4-methyl pyridine; 4-isopropyl pyridine; N,N-dimethylbenzyl amine; isoquinoline; 4-benzyl pyridine, N,N-dimethyldodecyl amine, triethyl amine, and the like. A variety of other catalysts for imidization are known in the art, such as imidazoles, and may be useful in accordance with the present disclosure.

The conversion chemicals can generally react at about room temperature or above to convert polyamic acid to polyimide. In one embodiment, the chemical conversion reaction occurs at temperatures from 15° C. to 120° C. with the reaction being very rapid at the higher temperatures and relatively slower at the lower temperatures.

In one embodiment, the chemically treated polyamic acid solution can be cast or extruded onto a heated conversion surface or substrate. In one embodiment, the chemically treated polyamic acid solution can be cast on to a belt or drum. The solvent can be evaporated from the solution, and the polyamic acid can be partially chemically converted to polyimide. The resulting solution then takes the form of a polyamic acid-polyimide gel. Alternately, the polyamic acid solution can be extruded into a bath of conversion chemicals consisting of an anhydride component (dehydrating agent), a tertiary amine component (catalyst) or both with or without a diluting solvent. In either case, a gel film is formed and the percent conversion of amic acid groups to imide groups in the gel film depends on contact time and temperature but is usually about 10 to 75 percent complete. For curing to a solids level greater than 98%, the gel film typically must be dried at elevated temperature (from about 200° C., up to about 550° C.), which will tend to drive the imidization to completion. In some embodiments, the use of both a dehydrating agent and a catalyst is preferred for facilitating the formation of a gel film and achieve desired conversion rates.

The gel film tends to be self-supporting in spite of its high solvent content. Typically, the gel film is subsequently dried to remove the water, residual solvent, and remaining conversion chemicals, and in the process the polyamic acid is essentially completely converted to polyimide (i.e., greater than 98% imidized). The drying can be conducted at relatively mild conditions without complete conversion of polyamic acid to polyimide at that time, or the drying and conversion can be conducted at the same time using higher temperatures. Because the gel has so much liquid that must be removed during the drying and converting steps, the gel generally must be restrained during drying to avoid undesired shrinkage. In continuous production, the base film can be held at the edges, such as in a tenter frame, using tenter clips or pins for restraint. High temperatures can be used for short times to dry the base film and induce further imidization to convert the gel film to a polyimide base film in the same step. In one embodiment, the base film is heated to a temperature of 200° C. to 550° C. Generally, less heat and time are required for thin films than for thicker films. During such drying and converting (from polyamic acid to polyimide), the base film can be restrained from undue shrinking and, in fact, may be stretched by as much as 150 percent of its initial dimension. In film manufacture, stretching can be in either the longitudinal direction or the transverse direction or both. If desired, restraint can also be adjusted to permit some limited degree of shrinkage.

In one embodiment, the polyamic acids are made by dissolving approximately equimolar amounts of a dianhydride and a diamine in a solvent and agitating the resulting solution under controlled temperature conditions until polymerization of the dianhydride and the diamine is completed. Typically a slight excess of one of the monomers (usually diamine) is used to initially control the molecular weight and viscosity which can then be increased later via small additional amounts of the deficient monomer.

In some embodiments, the chemically converted polyimide is derived from at least one aromatic dianhydride and at least one aromatic diamine. In some embodiments, the chemically converted polyimide is present in an amount between and including any two of the following: 61, 65, 70, 75, 80, 85, 90, 95 and 96 weight percent of the base film. In another embodiment, the chemically converted polyimide is derived from at least 50 mole percent of an aromatic dianhydride, based upon a total dianhydride content of the chemically converted polyimide, and at least 50 mole percent of an aromatic diamine based upon a total diamine content of the chemically converted polyimide.

In one embodiment, the aromatic dianhydride is selected from the group consisting of:
pyromellitic dianhydride;
3,3',4,4'-biphenyl tetracarboxylic dianhydride;
3,3',4,4'-benzophenone tetracarboxylic dianhydride;
4,4'-oxydiphthalic anhydride;
3,3',4,4'-diphenyl sulfone tetracarboxylic dianhydride;
2,2-bis(3,4-dicarboxyphenyl) hexafluoropropane;
Bisphenol A dianhydride; and
mixtures and derivatives thereof.

In another embodiment, the aromatic dianhydride is selected from the group consisting of:
2,3,6,7-naphthalene tetracarboxylic dianhydride;
1,2,5,6-naphthalene tetracarboxylic dianhydride;
2,2',3,3'-biphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
oxydiphthalic dianhydride;
bis(3,4-dicarboxyphenyl) sulfone dianhydride;
mixtures and derivatives thereof.

Examples of aliphatic dianhydrides include:
cyclobutane dianhydride;
[1 S*,5R*,6S*]-3-oxabicyclo[3.2.1]octane-2,4-dione-6-spiro-3-(tetrahydrofuran-2,5-dione);
mixtures thereof.

Examples of suitable diamines for use in the chemically converted polyimides of the present disclosure include aromatic diamines, aliphatic diamines and mixtures thereof. In one embodiment, the aromatic diamine is selected from a group consisting of:
3,4'-oxydianiline;
1,3-bis-(4-aminophenoxy) benzene;
4,4'-oxydianiline;
1,4-diaminobenzene;
1,3-diaminobenzene;
2,2'-bis(trifluoromethyl) benzidene;
4,4'-diaminobiphenyl;
4,4'-diaminodiphenyl sulfide;
9,9'-bis(4-amino)fluorine;
mixtures and derivatives thereof.

In another embodiment, the aromatic diamine is selected from a group consisting of:
4,4'-diaminodiphenyl propane;
4,4'-diamino diphenyl methane; benzidine;
3,3'-dichlorobenzidine;
3,3'-diamino diphenyl sulfone;
4,4'-diamino diphenyl sulfone;
1,5-diamino naphthalene;
4,4'-diamino diphenyl diethylsilane;
4,4'-diamino diphenysilane;
4,4'-diamino diphenyl ethyl phosphine oxide;
4,4'-diamino diphenyl N-methyl amine;
4,4'-diamino diphenyl N-phenyl amine;
1,4-diaminobenzene (p-phenylene diamine);
1,2-diaminobenzene;
Mixtures and derivatives thereof.

Examples of suitable aliphatic diamines include:
hexamethylene diamine,
dodecane diamine,
cyclohexane diamine;
and mixtures thereof.

In one embodiment, the chemically converted polyimide is derived from
a. at least 50 mole percent of an aromatic dianhydride based upon a total dianhydride content of the chemically converted polyimide; the aromatic dianhydride selected from the group consisting of:
pyromellitic dianhydride,
3,3',4,4'-biphenyl tetracarboxylic dianhydride,
3,3',4,4'-benzophenone tetracarboxylic dianhydride;
4,4'-oxydiphthalic anhydride,
3,3',4,4'-diphenyl sulfone tetracarboxylic dianhydride,
2,2-bis(3,4-dicarboxyphenyl) hexafluoropropane,
bisphenol A dianhydride, and mixtures thereof;
b. at least 50 mole percent of an aromatic diamine based upon a total diamine content of the chemically converted polyimide; the aromatic diamine selected from the group consisting of:
3,4'-oxydianiline,
1,3-bis-(4-aminophenoxy) benzene,
4,4'-oxydianiline,
1,4-diaminobenzene,
1,3-diaminobenzene,
2,2'-bis(trifluoromethyl) benzidene,
4,4'-diaminobiphenyl,
4,4'-diaminodiphenyl sulfide,
9,9'-bis(4-amino)fluorine and mixtures thereof.

In one embodiment, the chemically converted polyimides of the present disclosure are copolyimides derived from any of the above diamines and dianhydrides. In one embodiment, the copolyimide is derived from 15 to 85 mole % of biphenyltetracarboxylic dianhydride, 15 to 85 mole % pyromellitic dianhydride, 30 to 100 mole % p-phenylenediamine and optionally including 0 to 70 mole % of 4,4'-diaminodiphenyl ether and/or 4,4'-diaminodiphenyl ether. Such copolyimides are further described in U.S. Pat. No. 4,778,872 and U.S. Pat. No. 5,166,308.

In one embodiment, the chemically converted polyimide dianhydride component is pyromellitic dianhydride ("PMDA") and the chemically converted polyimide diamine component is a combination of 4,4'-oxydianiline ("4,4 ODA") and p-phenylenediamine ("PPD"). In one embodiment the chemically converted polyimide dianhydride component is pyromellitic dianhydride ("PMDA") and the chemically converted polyimide diamine component is a combination of 4,4'-oxydianiline ("4,4 ODA") and p-phenylenediamine ("PPD"), where the ratio of ODA to PPD (ODA:PPD) is any of the following mole ratios: i. 20-80: 80-20; ii. 50-70:50-30; or iii. 55-65: 45-35. In one embodiment the chemically converted polyimide dianhydride component is PMDA, and the diamine component is a mole ratio of ODA to PPD (ODA:PPD) of about 60:40.

In one embodiment, the chemically converted polyimide dianhydride component is 3,3',4,4'-biphenyltetracarboxylic dianhydride ("BPDA") and the chemically converted polyimide diamine component is a combination of 4,4'-oxydianiline ("4,4 ODA") and p-phenylenediamine ("PPD"). In one embodiment the chemically converted polyimide dianhydride component is BPDA and the chemically converted polyimide diamine component is a combination of 4,4 ODA and PPD, where the ratio of ODA to PPD (ODA:PPD) is any of the following mole ratios: i. 20-80: 80-20; ii. 50-70:50-30; or iii. 55-65: 45-35. In one embodiment the chemically converted polyimide dianhydride component is BPDA, and the diamine component is a mole ratio of ODA to PPD (ODA:PPD) of about 60:40.

In one embodiment, the chemically converted polyimide is derived from pyromellitic dianhydride ("PMDA") and 4,4'-oxydianiline ("4,4 ODA"). In one embodiment, the chemically converted polyimide is derived from 100 mole percent pyromellitic dianhydride and 100 mole percent 4,4'-oxydianiline.

In one embodiment, the polyamic acid solvent must dissolve one or both of the polymerizing reactants and in one embodiment, will dissolve the polyamic acid polymerization product. The solvent should be substantially unreactive with all of the polymerizing reactants and with the polyamic acid polymerization product. In one embodiment the polyamic acid solvent is a liquid N,N-dialkylcarboxylamide, such as, a lower molecular weight carboxylamide, particularly N,N-dimethylformamide and N,N-diethylacetamide. Other useful compounds of this class of solvents are N,N-diethylformamide and N,N-diethylacetamide. Other solvents which may be used are sulfolane, N-methyl-2-pyrrolidone, tetramethyl urea, dimethylsulfone, and the like. The solvents can be used alone or in combinations with one another. The amount of solvent used preferably ranges from 75 to 90 weight % of the polyamic acid.

The polyamic acid solutions are generally made by dissolving the diamine in a dry solvent and slowly adding the dianhydride under conditions of agitation and controlled temperature in an inert atmosphere. In some embodiments, the base film has a thickness from 8 to 152 microns. In some embodiments, the base film has a thickness from 8 to 127 microns. In yet another embodiment, the base film has a thickness from 10 to 40 microns. The thickness of the base film can be tailored to the specific application.

In some embodiments, the base film is intended to be used as a coverlay. In such embodiments, it is desirable to hide the conductor traces in the flex circuits from view. The desired optical density (opacity) of the base film (e.g., to hide the conductor traces in the flex circuits from view) is greater than or equal to 2. An optical density of 2 is intended to mean $1\times10^{-2}$ or 1% of light is transmitted through the base film.

Pigment

Virtually any pigment (or combination of pigments) can be used in the performance of the present invention. In some embodiments, useful pigments include but are not limited to the following: Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish, or Burnt Umber. In some embodiments, useful black pigments include: cobalt oxide, Fe—Mn—Bi black, Fe—Mn oxide spinel black, (Fe,Mn)2O3 black, copper chromite black spinel, lampblack, bone black, bone ash, bone char, hematite, black iron oxide, micaceous iron oxide, black complex inorganic color pigments (CICP), $CuCr_2O_4$ black, $(Ni,Mn,Co)(Cr,Fe)_2O_4$ black, Aniline black, Perylene black, Anthraquinone black, Chromium Green-Black Hematite, Chrome Iron Oxide, Pigment Green 17, Pigment Black 26, Pigment Black 27, Pigment Black 28, Pigment Brown 29, Pigment Black 30, Pigment Black 32, Pigment Black 33 or mixtures thereof.

In some embodiments, a low conductivity carbon black is used. The amount of low conductivity carbon black and the thickness of the base film will generally impact the optical density. If the low conductivity carbon black loading level is unduly high, the base film will be conductive even when a low conductivity carbon black is used. If too low, the base film may not achieve the desired optical density and color. The low conductivity carbon black, for the purpose of this disclosure, is used to impart the black color to the base film as well as to achieve the desired optical density of a base film having a thickness between and optionally including any two of the following: 8, 10, 15, 20, 25, 30, 35, 40, 45, 50, 60, 70, 80, 90, 100, 110, 120, 130, 140 and 152 microns. In some embodiments, the base film has a thickness from 8 to 152 microns. In some embodiments, the base film has a thickness from 8 to 127 microns. In yet another embodiment, the base film has a thickness from 10 to 40 microns.

Low conductivity carbon black is intended to mean, channel type black or furnace black. In some embodiments, a bone black may be used to impart the black color. In one embodiment, the low conductivity carbon black is present in amount between and optionally including any two of the following: 2, 3, 4, 5, 6, 7, 8 and 9 weight percent of the base film. In some embodiments, the optical density (opacity) desirable (e.g., to hide the conductor traces in the flex circuits from view) is greater than or equal to 2. An optical density of 2 is intended to mean $1\times10^{-2}$ or 1% of light is transmitted through the base film.

In some embodiments, the low conductivity carbon black is a surface oxidized carbon black. One method for assessing the extent of surface oxidation (of the carbon black) is to measure the carbon black's volatile content. The volatile content can be measured by calculating weight loss when calcined at 950° C. for 7 minutes. Generally speaking, a highly surface oxidized carbon black (high volatile content) can be readily dispersed into a polyamic acid solution (polyimide precursor), which in turn can be imidized into a (well dispersed) filled polyimide base polymer of the present disclosure. It is thought that if the carbon black particles (aggregates) are not in contact with each other, then electron tunneling, electron hopping or other electron flow mechanism are generally suppressed, resulting in lower electrical conductivity. In some embodiments, the low conductivity carbon black has a volatile content greater than or equal to 1%. In some embodiments, the low conductivity carbon black has a volatile content greater than or equal to 5, 9, or 13%. In some embodiments, furnace black may be surface treated to increase the volatile content.

A uniform dispersion of isolated, individual particles (aggregates) not only decreases the electrical conductivity, but additionally tends to produce uniform color intensity. In some embodiments the low conductivity carbon black is milled. In some embodiments, the mean particle size of the low conductivity carbon black is between (and optionally including) any two of the following sizes: 0.2, 0.3, 0.4, 0.5, 0.6, 0.7, 0.8, 0.9 and 1.0 microns. The thickness of the base film can be tailored to the specific application.

In some embodiments, a mixture of dye and low conductivity carbon black may be used. In such embodiments, the base film additionally comprises a dye present in an amount from 0.1 to 10 weight percent. In some embodiments, the dye is present between and including any two of the following: 0.1, 1, 5, and 10 weight percent. Examples of useful dyes are, but not limited to, nigrosin black, monoazo chromium complex black, or mixtures thereof.

Matting Agent

Polymeric materials typically have inherent surface gloss. To control gloss (and thereby produce matte surface characteristics) various additive approaches are possible to achieve dull and low gloss surface characteristics. Broadly speaking, the additive approaches are all based upon the same fundamental physics—to create a modified surface which is (on a micro-scale) coarse and irregular shaped and therefore allows less light to be reflected back to the distant (e.g., greater than 50 centimeters) observer. When multiple rays of light hit a glossy surface, most of the light is reflected with similar angle and therefore a relatively high level of light reflectance can be observed. When the same source of light hits a matte (ie. irregular) surface, the light is scattered in many different directions and also a much higher fraction is absorbed. Hence on rough surfaces, light tends to be diffusely scattered in all directions, and the image forming qualities are largely diminished (reflected objects no longer appear brilliant, but blurred).

Gloss meters used to characterize a specific surface for gloss level are based on this same principle. Typically, a light source hits a surface at a fixed angle and after reflection the amount of reflected light is read by a photo cell. Reflection can be read at multiple angles. Maximum gloss performance for a perfectly glossy surface tends to demonstrate 100% reflection, whereas a fully dull surface tends to demonstrate 0% reflection.

The amount of matting agent, median particle size and density must be sufficient to produce the desired 60 degree gloss value. In some embodiments, the base film 60 degree gloss value is between and optionally including any two of the following: 2, 5, 10, 15, 20, 25, 30 and 35. In some embodiments, the base film 60 degree gloss value is from 10 to 35. In some embodiments, the base film has a 60 degree gloss value from 2 to 35 on both sides.

One matting agent that can be useful in polyimide applications (can withstand the temperature processing of a chemically converted polyimide (processing temperatures of from about 250° C. to about 550° C.) are polyimide particles. In some embodiments, the base film comprises a particulate polyimide matting agent. In some embodiments, the particulate polyimide matting agent is present in an amount between and optionally including any two of the following: 1.6, 2, 3, 4, 5, 6, 7, 8, 9 and 20 weight percent of base film. In some embodiments, when the amount of particulate polyimide matting agent is below 1.6 weight percent of base film, the desired 60 degree gloss value is not achieved even when the particulate polyimide matting agent median particle size and density are in the desired ranges.

In some embodiments, the particulate polyimide matting agent has a median particle size between and optionally including any two of the following: 1.3, 2, 3, 4, 5, 6, 7, 8, 9 and 10 microns. The particulate polyimide matting agent should have a median particle size of less than (or equal to) about 10 microns and greater than (or equal to) about 1.3 microns. If the median particle size of the particulate polyimide matting agent is greater than 10 microns, mechanical properties of the base film may be negatively impacted. In some embodiments, when the median particle size is below 1.3 microns, the desired 60 degree gloss value is not achieved even when the amount of particulate polyimide matting agent and density are in the desired ranges.

In some embodiments, the particulate polyimide matting agent has a density between and optionally including any two of the following: 1.3, 1.4 and 1.5 g/cc. In one embodiment, a particulate polyimide matting agent present in an amount from 1.6 to 20 weight percent of the base film and having a density from 1.3 to 1.5 g/cc.

In a preferred embodiment, the refractive index of the matting agent should closely match the refractive index of the chemically converted polyimide. When the refractive indexes are close, there is less light scattering at the chemically converted polyimide and matting agent interface, resulting in lower haze and deeper, darker, more saturated color from the low conductivity carbon black.

In some embodiments, the particulate polyimide matting agent has a refractive index from 1.65 to 1.85. In some embodiments, the particulate polyimide matting agent has a refractive index between and including any two of the following: 1.65, 1.70, 1.75, 1.80 and 1.85. In some embodiments, the particulate polyimide matting agent has a refractive index from 1.65 to 1.85 and a median particle size from 1.3 to 10 microns. In some embodiments, the particulate polyimide matting agent has a refractive index between and including any two of the following: 1.65, 1.70, 1.75, 1.80 and 1.85 and a median particle size between and including any two of the following: 1.3, 2, 3, 4, 5, 6, 7, 8, 9 and 10 microns.

In some embodiments, the particulate polyimide matting agent and the chemically converted polyimide have a refractive index within and including 0.1 unit of each other. In some embodiments, the particulate polyimide matting agent and the chemically converted polyimide have a refractive index within and including 0.1 unit of each other and a median particle size from 1.3 to 10 microns. In some embodiments, the particulate polyimide matting agent and the chemically converted polyimide have a refractive index within and including 0.1 unit of each other and a median particle size between and including any two of the following: 1.3, 2, 3, 4, 5, 6, 7, 8, 9 and 10 microns.

In some embodiments, the particulate polyimide matting agent is derived from at least 50 mole percent of an aromatic dianhydride at least 50 mole percent of an aromatic diamine. In some embodiments, the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof.

The base film can be prepared by any method well known in the art for making a chemically converted, filled polyimide layer. In one such embodiment, a slurry comprising a low conductivity carbon black is prepared and a particulate polyimide matting agent slurry is prepared. The slurries may or may not be milled using a ball mill to reach the desired particle size. The slurries may or may not be filtered to remove any residual large particles. A polyamic acid solution can be made by methods well known in the art. The polyamic acid solution may or may not be filtered. In some embodiments, the solution is mixed in a high shear mixer with the low conductivity carbon black slurry and the particulate polyimide matting agent slurry. When a polyamic acid solution is made with a slight excess of diamine, additional dianhydride solution may or may not be added to increase the viscosity of the mixture to the desired level for film casting. The amount of the polyamic acid solution, low conductivity carbon black slurry, and particulate polyimide matting agent slurry can be adjusted to achieve the desired loading levels in the cured base film. In some embodiments the mixture is cooled below 0° C. and mixed with conversion chemicals prior to casting onto a heated rotating drum or belt in order to produce a partially imidized gel film. The gel film may be stripped from the drum or belt, placed on a tenter frame, and cured in an oven, using convective and radiant heat to remove solvent and complete the imizidation to greater than 98% solids level.

Adhesive

In some embodiments, the base film is a multilayer film comprising the base film of the present disclosure and an adhesive layer. The base film of the present disclosure can comprise an adhesive layer for maintaining the base film in place, once applied. In some embodiments, the multilayer film is a coverlay film.

In one embodiment, the adhesive consists of an epoxy resin and hardener, and, optionally, further contains additional components, such as, an elastomer, curing accelerator (catalyst), hardener, filler and flame retardant.

In some embodiments, the adhesive is an epoxy resin. In some embodiments, the epoxy resin is selected from the group consisting of:
Bisphenol F type epoxy resin,
Bisphenol S type epoxy resin,
Phenol novolac type epoxy resin,
Biphenyl type epoxy resin,
Biphenyl aralkyl type epoxy resin,
Aralkyl type epoxy resin,
Dicyclopetadiene type epoxy resin,
Multifunctional type epoxy resin,
Naphthalene type epoxy resin,
Rubber modified epoxy resin, and
mixtures thereof.

In another embodiment, the adhesive is an epoxy resin selected from the group consisting of bisphenol A type epoxy resin, cresol novolac type epoxy resin, phosphorus containing epoxy resin, and mixtures thereof. In some embodiments, the adhesive is a mixture of two or more epoxy resins. In some embodiments, the adhesive is a mixture of the same epoxy resin having different molecular weights.

In some embodiments, the epoxy adhesive contains a hardener. In one embodiment, the hardener is a phenolic compound. In some embodiments, the phenolic compound is selected from the group consisting of: Novolac type phenol resin, Aralkyl type phenol resin, Biphenyl aralkyl type phenol resin, Multifunctional type phenol resin, Nitrogen containing phenol resin, Dicyclopetadiene type phenol resin, Phosphorus containing phenol resin, and Triazine containing phenol novolac resin.

In another embodiment, the hardener is an aromatic diamine compound. In some embodiments, the aromatic diamine compound is a diaminobiphenyl compound. In some embodiments, the diaminobiphenyl compound is 4,4'-diaminobiphenyl or 4,4'-diamino-2,2'-dimethylbiphenyl. In some embodiments, the aromatic diamine compound is a diaminodiphenylalkane compound. In some embodiments, the diaminodiphenylalkane compound is 4,4'-diaminodiphenylmethane or 4,4'-diaminodiphenylethane. In some embodiments, the aromatic diamine compound is a diaminodiphenyl ether compound. In some embodiments, the diaminodiphenyl ether compounds is 4,4'-diaminodiphenylether or di(4-amino-3-ethylphenyl)ether. In some embodiments, the aromatic diamine compound is a diaminodiphenyl thioether compound. In some embodiments, the diaminodiphenyl thioether compound is 4,4'-diaminodiphenyl thioether or di(4-amino-3-propylphenyl)thioether. In some embodiments, the aromatic diamine compound is a diaminodiphenyl sulfone compound. In some embodiments, the diaminodiphenyl sulfone compound is 4,4'-diaminodiphenyl sulfone or di(4-amino-3-isopropylphenyl)sulfone. In some embodiments, the aromatic diamine compound is phenylenediamine. In one embodiment, the hardener is an amine compound. In some embodiments, the amine compound is a guanidine. In some embodiments, the guanidine is dicyandiamide (DICY). In another embodiment, the amine compound is an aliphatic diamine. In some embodiments, the aliphatic diamine is ethylenediamine or diethylenediamine.

In some embodiments, the epoxy adhesive contains a catalyst. In some embodiments, the catalyst is selected from the group consisting of imidazole type, triazine type, 2-ethyl-4-methyl-imidazole, triazine containing phenol novolac type and mixtures thereof.

In some embodiments, the epoxy adhesive contains a elastomer toughening agent. In some embodiments, the elastic toughening agent is selected from the croup consisting of ethylene-acryl rubber, acrylonitrile-butadiene rubber, carboxy terminated acrylonitrile-butadiene rubber and mixtures thereof.

In some embodiments, the epoxy adhesive contains a flame retardant. In some embodiments, the flame retardant is selected from the group consisting of aluminum trihydroxide, melamine polyphosphate, condensed polyphosphate ester, other phosphorus containing flame retardants and mixtures thereof.

In some embodiments, the adhesive layer is selected from the group consisting of: polyimide, butyral phenolic, polysiloxane, polyimidesiloxane, fluorinated ethylene propylene copolymers, perfluoroalkoxy copolymers, ethylene vinyl acetate copolymers, ethylene vinyl acetate glycidyl acrylate terpolymer, ethylene vinyl acetate glycidyl methacrylate terpolymer, ethylene alkyl acrylate copolymers with adhesion promotor, ethylene alkyl methacrylate copolymers with adhesion promotor, ethylene glycidyl acrylate, ethylene glycidyl methacrylate, ethylene alkyl acrylate glycidyl acrylate terpolymer, ethylene alkyl methacrylate glycidyl acrylate terpolymer, ethylene alkyl acrylate maleic anhydride terpolymers, ethylene alkyl methacrylate maleic anhydride terpolymers, ethylene alkyl acrylate glycidyl methacrylate terpolymers, ethylene alkyl methacrylate glycidyl methacrylate terpolymers, alkyl acrylate acrylonitrile acrylic acid terpolymers, alkyl acrylate acrylonitrile methacrylic acid terpolymers, ethylene acrylic acid copolymer including salts thereof, ethylene methacrylic acid copolymer including salts thereof, alkyl acrylate acrylonitrile glycidyl methacrylate terpolymers, alkyl methacrylate acrylonitrile glycidyl methacrylate terpolymers, alkyl acrylate acrylonitrile glycidyl acrylate terpolymers, alkyl methacrylate acrylonitrile glycidyl acrylate terpolymers, polyvinyl butyral, ethylene alkyl acrylate methacrylic acid terpolymers and salts thereof, ethylene alkyl methacrylate methacrylic acid terpolymers and salts thereof, ethylene alkyl acrylate acrylic acid terpolymers and salts thereof, ethylene alkyl methacrylate acrylic acid terpolymers and salts thereof, ethylene ethyl hydrogen maleate, ethylene alkyl acrylate ethyl hydrogen maleate, ethylene alkyl methacrylate ethyl hydrogen maleate and mixtures thereof.

The adhesive can be applied to the base film by lamination or coating. Coating methods include, but are not limited to, spray coating, powder coating, extrusion/slot die, gravure, offset gravure, roll coating, and dip/immersion.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride based upon a total dianhydride content of the chemically converted polyimide, and b. at least 50 mole percent of an aromatic diamine based upon a total diamine content of the chemically converted polyimide;
B. a low conductivity carbon black present in an amount from 2 to 9 weight percent of the base film; and
C. a particulate polyimide matting agent present in an amount from 1.6 to 20 weight percent of the base film and having a density from 1.3 to 1.5 g/cc.

In some embodiments, the base film comprises:
A. a chemically converted polyimide present in an amount from 61 to 96 weight percent of the base film, the chemically converted polyimide being derived from:
  a. at least 50 mole percent an aromatic dianhydride, based upon a total dianhydride content of the chemically converted polyimide, and
  b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc and having a median particle size from 1.3 to 10 microns.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride, based upon a total dianhydride content of the chemically converted polyimide, and
  b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns and having refractive index from 1.65 to 1.85.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride, based upon a total dianhydride content of the chemically converted polyimide, and
  b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, having refractive index from 1.65 to 1.85; and wherein the base film has a 60 degree gloss value from 2 to 35 on both sides.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride, based upon a total dianhydride content of the chemically converted polyimide, and
  b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film and having a density from 1.3 to 1.5 g/cc, having a median particle size from 1.3 to 10 microns and wherein the particulate polyimide matting agent and the chemically converted polyimide have a refractive index within and including 0.1 unit of each other.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride, based upon a total dianhydride content of the chemically converted polyimide, and
  b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film and having a density from 1.3 to 1.5 g/cc, having a median particle size from 1.3 to 10 microns, the particulate polyimide matting agent and the chemically converted polyimide have a refractive index within and including 0.1 unit of each other and wherein the base film has a 60 degree gloss value from 2 to 35 on both sides.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride, based upon a total dianhydride content of the chemically converted polyimide, and
  b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc and wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride, based upon a total dianhydride content of the chemically converted polyimide, and
   b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns and wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride, based upon a total dianhydride content of the chemically converted polyimide, and
   b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, having refractive index from 1.65 to 1.85 and wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride, based upon a total dianhydride content of the chemically converted polyimide, and
   b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, having refractive index from 1.65 to 1.85, wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof and wherein the base film has a 60 degree gloss value from 2 to 35 on both sides.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride, based upon a total dianhydride content of the chemically converted polyimide, and
   b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof; and wherein the particulate polyimide matting agent and the chemically converted polyimide have a refractive index within and including 0.1 unit of each other.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride, based upon a total dianhydride content of the chemically converted polyimide, and
   b. at least 50 mole percent of an aromatic diamine based upon a total diamine content of the chemically converted polyimide;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof; wherein the particulate polyimide matting agent and the chemically converted polyimide have a refractive index within and including 0.1 unit of each other and wherein the base film has a 60 degree gloss value from 2 to 35 on both sides.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
   b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film; and
C. a particulate polyimide matting agent present in an amount from 1.6 to 20 weight percent of the base film and having a density from 1.3 to 1.5 g/cc.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
   b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film and having a density from 1.3 to 1.5 g/cc and having a median particle size from 1.3 to 10 microns.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
   b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns and having refractive index from 1.65 to 1.85.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
  b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, having refractive index from 1.65 to 1.85 and wherein the base film has a 60 degree gloss value from 2 to 35 on both sides.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
  b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, wherein the particulate polyimide matting agent and the chemically converted polyimide have a refractive index within and including 0.1 unit of each other.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
  b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, wherein the particulate polyimide matting agent and the chemically converted polyimide have a refractive index within and including 0.1 unit of each other and wherein the base film has a 60 degree gloss value from 2 to 35 on both sides.

In some embodiments, the base film comprises:
A. a chemically converted polyimide present in an amount from 61 to 96 weight percent of the base film, the chemically converted polyimide being derived from:
  a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
  b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, and wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
   b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, and wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
   b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, having a refractive index from 1.65 to 1.85 and wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof.

In some embodiments, the base film comprises:
A. a chemically converted polyimide present in an amount from 61 to 96 weight percent of the base film, the chemically converted polyimide being derived from:
   a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
   b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, having a refractive index from 1.65 to 1.85 and wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof, and wherein the base film has a 60 degree gloss value from 2 to 35 on both sides.

In some embodiments, the base film comprises:
A. a chemically converted polyimide present in an amount from 61 to 96 weight percent of the base film, the chemically converted polyimide being derived from:
 a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
 b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof; wherein the particulate polyimide matting agent and the chemically converted polyimide have a refractive index within and including 0.1 unit of each other; and wherein the base film has a 60 degree gloss value from 2 to 35 on both sides.

In some embodiments, the base film comprises:
A. a chemically converted polyimide present in an amount from 61 to 96 weight percent of the base film, the chemically converted polyimide being derived from:
 a. at least 50 mole percent of an aromatic dianhydride based upon a total dianhydride content of the chemically converted polyimide; the aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, and mixtures thereof;
 b. at least 50 mole percent of an aromatic diamine based upon a total diamine content of the chemically converted polyimide; the aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof;
B. a low conductivity carbon black present in an amount from 2 to 9 weight percent of the base film;
C. a particulate polyimide matting agent present in an amount from 1.6 to 20 weight percent of the base film, having a density from 1.3 to 1.5 g/cc, having a median particle size from 1.3 to 10 microns, wherein the particulate polyimide matting agent is derived from at least 50 mole percent of an aromatic dianhydride selected from the group consisting of: pyromellitic dianhydride, 3,3',4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl) hexafluoropropane, bisphenol A dianhydride, mixtures thereof; and at least 50 mole percent of an aromatic diamine selected from the group consisting of: 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine and mixtures thereof; wherein the particulate polyimide matting agent and the chemically converted polyimide have a refractive index within and including 0.1 unit of each other; and wherein the base film has a 60 degree gloss value from 2 to 35 on both sides.

In accordance with any of the above embodiments, the base film is a multilayer film comprising the base film and an adhesive layer.

What is claimed is:
1. A base film comprising:
A. a chemically converted polyimide present in an amount from 75 to 96 weight percent of the base film, the chemically converted polyimide being derived from:
 a. 100 mole percent pyromellitic dianhydride, based upon a total dianhydride content of the chemically converted polyimide, and
 b. 100 mole percent 4,4'-oxydianiline based upon a total diamine content of the chemically converted polyimide;
B. a low conductivity carbon black present in an amount from 2 to 9 weight percent of the base film; and

C. a particulate polyimide matting agent present in an amount from 1.6 to 9 weight percent of the base film and having a median particle size from 1.3 to 10 microns.

2. The base film in accordance with claim 1 wherein the particulate polyimide matting agent has a refractive index from 1.65 to 1.85.

3. The base film in accordance with claim 1, wherein the particulate polyimide matting agent and the chemically converted polyimide have a refractive index within and including 0.1 unit of each other.

4. The base film in accordance with claim 1 wherein the particulate polyimide matting agent is derived from at least 50 mole percent of an aromatic dianhydride and at least 50 mole percent of an aromatic diamine.

5. A multilayer film comprising the base film of claim 1 and an adhesive layer.

6. The multilayer film in accordance with claim 5, wherein the adhesive layer is an epoxy resin selected from the group consisting of: bisphenol A type epoxy resin, cresol novolac type epoxy resin, phosphorus containing epoxy resin, and mixtures thereof.

7. The base film in accordance with claim 1 additionally comprising a dye present in an amount from 0.1 to 10 weight percent.

8. A base film comprising:
A. a chemically converted polyimide present in an amount from 75 to 96 weight percent of the base film, the chemically converted polyimide being derived from:
   a. 100 mole percent pyromellitic dianhydride, based upon a total dianhydride content of the chemically converted polyimide, and
   b. 100 mole percent 4,4'-oxydianiline based upon a total diamine content of the chemically converted polyimide;
B. a low conductivity carbon black present in an amount from 2 to 9 weight percent of the base film; and
C. a particulate polyimide matting agent present in an amount from 1.6 to 9 weight percent of the base film, having a median particle size from 1.3 to 10 microns and having a refractive index from 1.65 to 1.85; and
wherein the base film has a 60 degree gloss value from 2 to 35 on both sides.

9. A base film comprising:
A. a chemically converted polyimide present in an amount from 75 to 96 weight percent of the base film, the chemically converted polyimide being derived from:
   a. 100 mole percent pyromellitic dianhydride, based upon a total dianhydride content of the chemically converted polyimide, and
   b. 100 mole percent 4,4'-oxydianiline based upon a total diamine content of the chemically converted polyimide;
B. a low conductivity carbon black present in an amount from 2 to 9 weight percent of the base film; and
C. a particulate polyimide matting agent present in an amount from 1.6 to 9 weight percent of the base film and having a median particle size from 1.3 to 10 microns, the particulate polyimide matting agent and the chemically converted polyimide have a refractive index within and including 0.1 unit of each other; and
wherein the base film has a 60 degree gloss value from 2 to 35 on both sides.

* * * * *